United States Patent
Lillie et al.

(10) Patent No.: US 7,606,370 B2
(45) Date of Patent: Oct. 20, 2009

(54) SYSTEM, METHOD AND COMPUTER PROGRAM PRODUCT FOR UPDATING SECURITY CRITERIA IN WIRELESS NETWORKS

(75) Inventors: Terrance L. Lillie, Redwood City, CA (US); Christian Wiedmann, Redwood City, CA (US); Robert Zeljko, San Jose, CA (US); Richard P. Sneiderman, Sunnyvale, CA (US); Ulrich Wiedmann, Redwood City, CA (US); Gigi C. Chu, Sunnyvale, CA (US); Sean R. Lynch, San Jose, CA (US)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 11/359,119

(22) Filed: Feb. 21, 2006

(65) Prior Publication Data

US 2006/0251258 A1 Nov. 9, 2006

Related U.S. Application Data

(60) Provisional application No. 60/668,682, filed on Apr. 5, 2005, provisional application No. 60/668,776, filed on Apr. 5, 2005, provisional application No. 60/668,684, filed on Apr. 5, 2005, provisional application No. 60/668,642, filed on Apr. 5, 2005, provisional application No. 60/756,954, filed on Jan. 5, 2006.

(51) Int. Cl.
*H04L 9/00* (2006.01)

(52) U.S. Cl. .............. 380/278; 380/247; 380/255; 380/277; 713/153; 713/155; 713/163; 713/166; 713/167; 713/168; 713/171; 726/2; 726/3; 726/14; 726/15

(58) Field of Classification Search .............. 713/155, 713/166, 168, 153, 163, 167, 171; 726/3, 726/14, 15, 2; 380/277, 278, 247, 255
See application file for complete search history.

(56) References Cited

U.S. PATENT DOCUMENTS

| | | | | |
|---|---|---|---|---|
| 5,515,439 | A * | 5/1996 | Bantz et al. | 713/156 |
| 6,005,942 | A * | 12/1999 | Chan et al. | 713/187 |
| 6,023,689 | A * | 2/2000 | Herlin et al. | 705/67 |
| 6,038,318 | A * | 3/2000 | Roden | 380/30 |
| 6,253,228 | B1 * | 6/2001 | Ferris et al. | 709/203 |
| 6,253,326 | B1 * | 6/2001 | Lincke et al. | 726/12 |
| 6,298,446 | B1 * | 10/2001 | Schreiber et al. | 726/27 |
| 6,530,065 | B1 * | 3/2003 | McDonald et al. | 716/4 |
| 6,587,684 | B1 * | 7/2003 | Hsu et al. | 455/419 |

(Continued)

OTHER PUBLICATIONS

H. Nakakita et al "A Study on Secure Wireless Networks Consisting of Home Appliances" IEEE 2003, Apr. 25, 2003, pp. 375-381.*

(Continued)

*Primary Examiner*—Carl Colin
(74) *Attorney, Agent, or Firm*—Zilka-Kotab, PC

(57) ABSTRACT

A system, method and computer program product are provided. In use, a key is distributed to a plurality of nodes of a wireless network for use in securing the nodes during use of the wireless network. Further, the key is automatically updated at the nodes in the wireless network based on predetermined criteria.

28 Claims, 8 Drawing Sheets

U.S. PATENT DOCUMENTS

| | | | | |
|---|---|---|---|---|
| 6,615,238 | B1* | 9/2003 | Melet et al. | 709/203 |
| 6,671,523 | B1* | 12/2003 | Niepel et al. | 455/558 |
| 6,819,340 | B2* | 11/2004 | Burke | 715/738 |
| 6,839,434 | B1* | 1/2005 | Mizikovsky | 380/247 |
| 6,918,084 | B1 | 7/2005 | Slaughter et al. | 715/205 |
| 6,937,140 | B1* | 8/2005 | Outslay et al. | 340/5.73 |
| 6,965,674 | B2* | 11/2005 | Whelan et al. | 380/270 |
| 6,973,490 | B1* | 12/2005 | Robertson et al. | 709/224 |
| 6,990,580 | B2* | 1/2006 | Go et al. | 713/168 |
| 7,024,553 | B1* | 4/2006 | Morimoto | 713/163 |
| 7,072,967 | B1 | 7/2006 | Saulpaugh et al. | 709/229 |
| 7,099,476 | B2* | 8/2006 | Chen et al. | 380/277 |
| 7,142,851 | B2* | 11/2006 | Zhang et al. | 455/426.2 |
| 7,152,220 | B2* | 12/2006 | Rickards et al. | 717/101 |
| 7,165,107 | B2* | 1/2007 | Pouyoul et al. | 709/225 |
| 7,181,015 | B2* | 2/2007 | Matt | 380/279 |
| 7,188,138 | B1 | 3/2007 | Schneider | 709/203 |
| 7,206,841 | B2* | 4/2007 | Traversat et al. | 709/225 |
| 7,231,373 | B2* | 6/2007 | Kidd et al. | 705/75 |
| 7,243,366 | B2* | 7/2007 | Medvinsky et al. | 726/2 |
| 7,257,583 | B2* | 8/2007 | Hofmeister et al. | 707/10 |
| 7,299,354 | B2* | 11/2007 | Khanna et al. | 713/165 |
| 7,356,705 | B2 | 4/2008 | Ting | 713/186 |
| 7,409,452 | B2 | 8/2008 | Ragnet et al. | 709/227 |
| 2002/0002678 | A1* | 1/2002 | Chow et al. | 713/169 |
| 2002/0053024 | A1* | 5/2002 | Hashimoto et al. | 713/168 |
| 2002/0078170 | A1* | 6/2002 | Brewer et al. | 709/218 |
| 2002/0092004 | A1* | 7/2002 | Lee et al. | 717/140 |
| 2003/0026433 | A1 | 2/2003 | Matt | 380/278 |
| 2003/0061170 | A1* | 3/2003 | Uzo | 705/64 |
| 2003/0095660 | A1 | 5/2003 | Lee et al. | 380/231 |
| 2003/0099362 | A1* | 5/2003 | Rollins | 380/278 |
| 2003/0210787 | A1 | 11/2003 | Billhartz et al. | 380/270 |
| 2003/0210788 | A1 | 11/2003 | Billhartz et al. | 380/270 |
| 2003/0210789 | A1* | 11/2003 | Farnham et al. | 380/270 |
| 2003/0219129 | A1 | 11/2003 | Whelan et al. | 380/270 |
| 2004/0034797 | A1* | 2/2004 | Becker Hof | 713/201 |
| 2004/0080528 | A1* | 4/2004 | Rand et al. | 345/738 |
| 2004/0103282 | A1* | 5/2004 | Meier et al. | 713/171 |
| 2004/0103316 | A1* | 5/2004 | Gehrmann | 713/201 |
| 2004/0148229 | A1* | 7/2004 | Maxwell | 705/26 |
| 2004/0237068 | A1* | 11/2004 | Ren | 717/110 |
| 2004/0243828 | A1* | 12/2004 | Aguilera et al. | 713/200 |
| 2004/0250130 | A1* | 12/2004 | Billharz et al. | 713/201 |
| 2004/0255145 | A1 | 12/2004 | Chow | 713/200 |
| 2005/0021979 | A1* | 1/2005 | Wiedmann et al. | 713/182 |
| 2005/0022007 | A1 | 1/2005 | Phillips et al. | 713/201 |
| 2005/0044356 | A1* | 2/2005 | Srivastava et al. | 713/163 |
| 2005/0235345 | A1* | 10/2005 | Mitchell et al. | 726/10 |
| 2005/0262076 | A1* | 11/2005 | Voskuil | 707/8 |
| 2006/0133614 | A1* | 6/2006 | Zhang et al. | 380/273 |
| 2006/0206587 | A1* | 9/2006 | Fabbrocino | 709/219 |
| 2006/0245590 | A1* | 11/2006 | Brickell | 380/44 |
| 2006/0251256 | A1* | 11/2006 | Asokan et al. | 380/270 |

OTHER PUBLICATIONS

Mauro Brunato and Danilo Severina; "WilmaGate: a New Open Access Gateway for Hotspot Management"; ACM Sep. 2, 2005,pp. 56-64.*

Haidong Xia, Jose Brustoloni; "Virtual Prepaid Tokens for Wi-Fi HotSpot Access"; IEEE 2004; pp. 1-8.*

Luis Carlos Wong; "An Overview of 802.11 Wireless Network Security Standards & Mechanisms"; Oct. 21, 2004; SANS Institute; pp. 1-16.*

Bruce Schneier; "Applied Cryptography, Second Edition: Protocols, Algorithms, and Source Code in C"; John Wiley & Sons, Inc; ISBN: 0471128457; Publication Date: Jan. 1, 1996; pp. 687-703.*

Microsoft Corporation, "Malicious Software Learn More"; 2003; pp. 1-5.*

Adam Young, Naveen Sastry, Umesh Shankar, David Wagner, Christian Gehrmann, Chris J. Mitchell, Kaisa Nyberg; "CryptoBytes"; RSA Laboratories vol. 7, No. 1, Spring 2004; 40 Pages.*

US Patent Application entitled "Methods and Systems for Exchanging Security Information Via Peer-to-Peer Wireless Networks," filed coincidently herewith, listing the same inventors.

US Patent Application entitled "Captive Portal System and Method for Use in Peer-to-Peer Networks," filed coincidently herewith, listing the same inventors.

US Patent Application entitled "Remotely Configurable Bridge System and Method for Use in Secure Wireless Networks," filed coincidently herewith, listing the same inventors.

Office Action Summary from U.S. Appl. No. 11/359,183 mailed on Dec. 11, 2007.

U.S. Appl. No. 60/668,682, filed on Apr. 5, 2005.

U.S. Appl. No. 60/668,776, filed on Apr. 5, 2005.

U.S. Appl. No. 60/668,684, filed on Apr. 5, 2005.

U.S. Appl. No. 60/668,642, filed on Apr. 5, 2005.

U.S. Appl. No. 60/756,954, filed on Jan. 5, 2006.

International Search Report and Written Opinion from PCT Application No. PCT/US06/08662 mailed on Jul. 6, 2007.

Final Office Action Summary from U.S. Appl. No. 11/359,183 mailed on Jun. 26, 2008.

Office Action Summary from U.S. Appl. No. 11/359,200 mailed on Jun. 12, 2008.

Final Office Action Summary from U.S. Appl. No. 11/359,200 mailed on Dec. 29, 2008.

Office Action Summary from U.S. Appl. No. 11/359,183 mailed on Nov. 13, 2008.

International Preliminary Report from PCT Application No. PCT/US2006/008662 mailed on Oct. 18, 2007.

Final Office Action Summary from U.S. Appl. No.11/359,183 mailed on Jul. 10, 2009.

Office Action Summary from U.S. Appl. No. 11/359,208 mailed on Apr. 13, 2009.

* cited by examiner

SYSTEM, METHOD AND COMPUTER PROGRAM PRODUCT FOR UPDATING SECURITY CRITERIA IN WIRELESS NETWORKS

RELATED APPLICATION(S)

The present application claims priority from a plurality of provisional applications each filed Apr. 05, 2005 including U.S. application Ser. No. 60/668,682; U.S. application Ser. No. 60/668,776; U.S. application Ser. No. 60/668,684; and U.S. application Ser. No. 60/668,642; which are each incorporated herein by reference. The present application further claims priority from a provisional application filed Jan. 05, 2006 under U.S. application Ser. No. 60/756,954; which is also incorporated herein by reference.

FIELD OF THE INVENTION

The present invention relates to network security, and more particularly to providing security in wireless networks.

BACKGROUND

With the advent of low-cost hardware, wireless computer networks are becoming ubiquitous in homes and offices throughout the United States and elsewhere. Many of these networks employ hardware and software for wireless communications that is compliant with one or more of the standards promulgated by the Institute of Electrical and Electronic Engineers (IEEE). For example, the 802.11 family of standards are contemplated which includes 802.11a, 802.11b, 802.11g and others. Among the reasons for widespread adoption of such networks is the flexibility and ease of installation afforded by wireless communications.

With such benefits come some drawbacks, however. For example, wireless networks are known to be less secure than their wired counterparts inasmuch as attacks against such networks can be launched from physically remote locations that network administrators may be incapable of monitoring. To combat such threats, network administrators often employ various security protocols, among them the use of encrypted communications and access control measures. For 802.11-compliant networks, WEP (Wired Equivalent Privacy) and WPA (Wi-Fi Protected Access) protocols are often used to encrypt data within a wireless network so that only an intended recipient is able to read it. Although neither of these security protocols is perfect, they do afford some protection against casual hackers.

Both WEP and WPA operate on the basis of encryption keys that are used to authenticate devices seeking to gain access to the wireless network and, if desired, to encrypt/decrypt messages exchanged between nodes that are so admitted. Authentication is the process of proving identity and the 802.11 standards specify that, when used, it involves a four-step process to determine whether or not the device seeking access to the network has the correct key.

For example, as illustrated in FIG. 1, a requesting node 100 starts by sending an authentication request in operation 101 to a granting node 102 such as an access point or the like. In an 802.11-compliant network, the granting node 102 taking the form of an access point acts as a gatekeeper, allowing or not allowing other nodes to join the wireless network. The granting node 102 sends a challenge message in operation 104 to the requesting node 100 and, in order to gain admission to the network, the requesting node 100 must successfully encrypt the challenge message 104 using its key (e.g. WEP key, etc.), and send a response (see operation 106) back to the granting node 102.

The granting node 102 then decrypts the challenge message and compares it to the initial message. If the message is equivalent, the granting node 102 assumes that the requesting node 100 has the correct key and will grant that node access to the wireless network by confirming a success, per operation 108. Thus, any new users seeking to join a wireless network secured by WEP or a similar scheme that relies on shared keys must, prior to so joining the network, have knowledge of and/or access to those keys.

Early adopters of wireless networks (such as the one shown in FIG. 1) have, unfortunately, been disappointed to learn that such networks are less secure than their wired counterparts. Although the original IEEE 802.11 standards include cryptographic security measures in the form of WEP, those measures have proved rather easy for hackers to circumvent. As a result, WEP is deemed by most computer security specialists to be a rather weak form of protection for a wireless network.

Further, the aforementioned WPA protocol calls for the use of authentication servers external to a given wireless network to ensure that only authorized clients are given access to that network. This sort of scheme is unfortunately not practical for many networks. Thus, a WPA-PSK (pre-shared key) variant has been introduced which, like WEP, relies on the use of an encryption key that is programmed into an access point and a client in order to authenticate the client before allowing it access to a network. Thus, like ordinary WEP, WPA-PSK is vulnerable if a hacker can uncover the encryption key by monitoring the traffic across the wireless network.

Another updated form of security for wireless networks is temporal key integrity protocol (TKIP) specified in the IEEE 802.11i standard. TKIP uses a mixing function to generate dynamic encryption keys that change over time. This essentially defeats attempts by hackers to recover the key from monitored network traffic, thereby making it much harder for the hackers to infiltrate the network. Unfortunately, however, legacy 802.11 products are not configured to operate using TKIP and so remain vulnerable to attacks by hackers through traffic monitoring.

There is thus a need for overcoming these and other security problems.

SUMMARY

A system, method and computer program product are provided. In use, a key is distributed to a plurality of nodes of a wireless network for use in securing the nodes during use of the wireless network. Further, the key is automatically updated at the nodes in the wireless network based on predetermined criteria.

DETAILED DESCRIPTION

Figure 1:
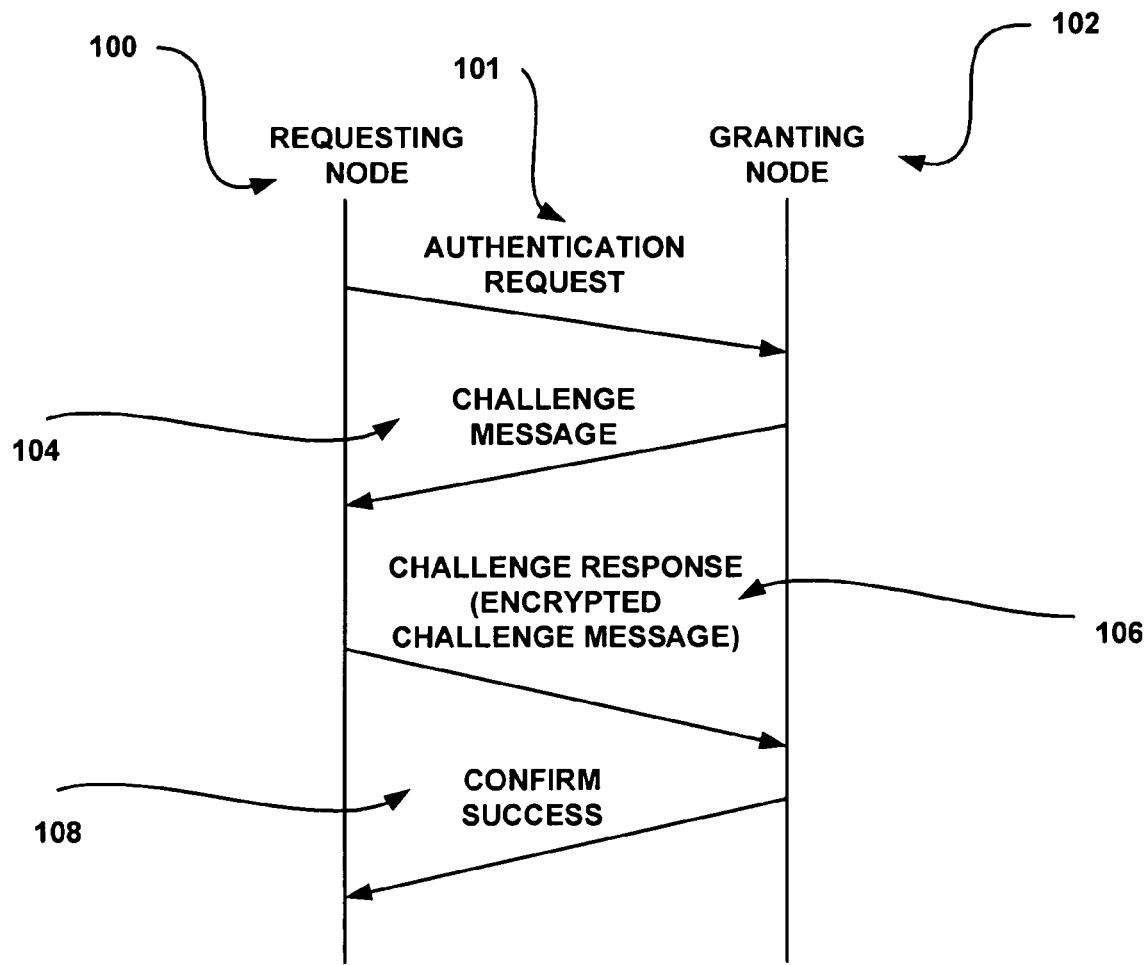
FIG. 1 illustrates a prior art authentication flow.
Figure 2:
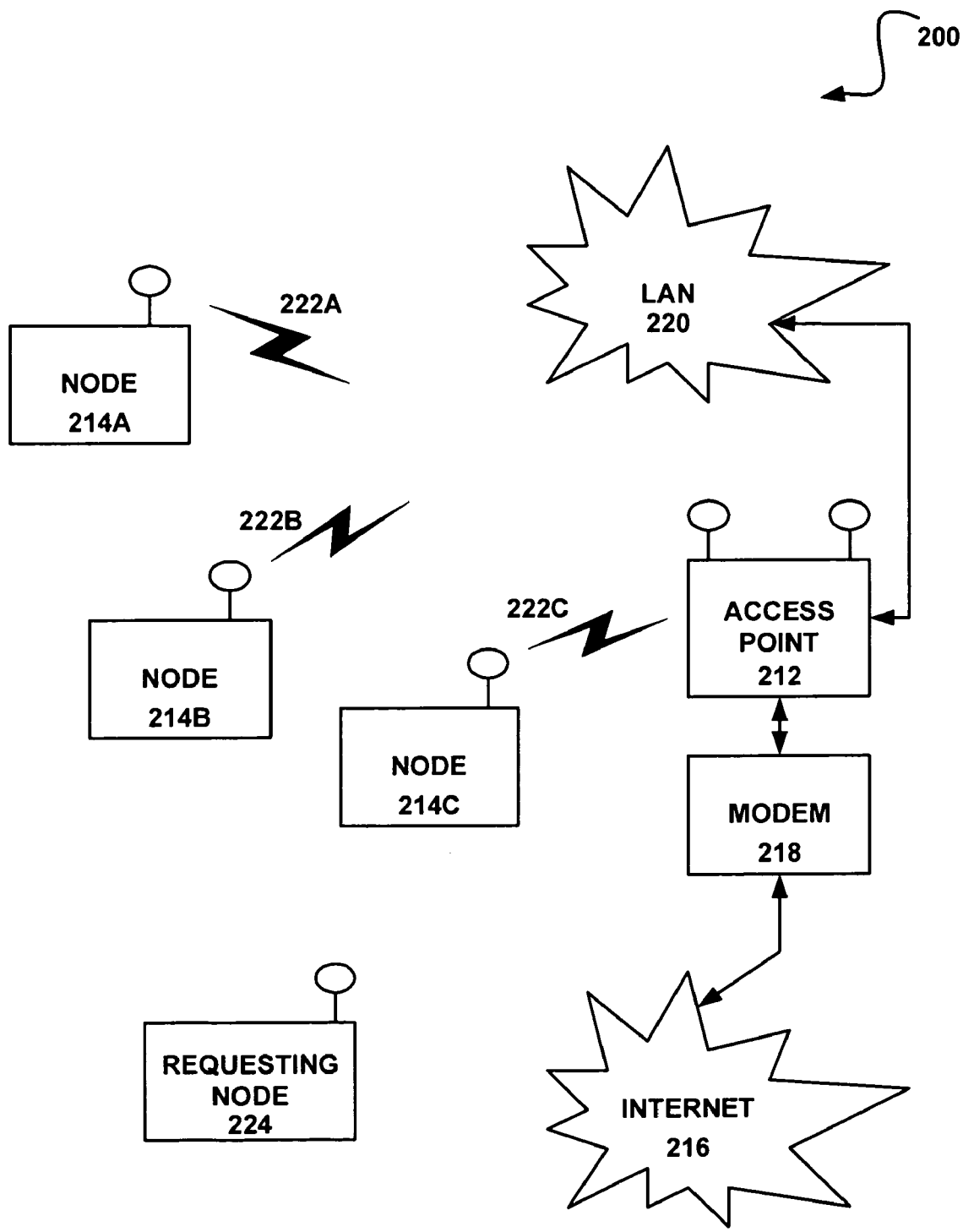
FIG. 2 illustrates a network architecture, in accordance with one embodiment.

FIG. 2 illustrates a network architecture 200, in accordance with one embodiment. As shown, the network architecture 200 includes an access point 212 and three wireless nodes 214A-214C. In the context of the present description, the term node may refer to any type of device, including but not limited to personal (e.g. notebook, etc.) computers, handheld computers, mobile phones, personal digital assistants, media centers/players, music recorders/players, other "headless" devices, printers, print servers, and/or any other computing device, for that matter.

Access to the Internet 216 may be provided via a modem 218 (e.g. an xDSL or cable modem, etc.) connected to the access point 212, in which case the access point 212 may also serve as a router, etc. Similarly, the access point 212 may serve as a bridge to a local area network (LAN) 220, which may include unillustrated non-wireless capable nodes such as printers, scanners, personal computers, etc. The network architecture 200 may be made up of wireless communication links 222A-222C between each of the wireless nodes 214A-214C and the access point 212.

In the context of the present description, a wireless network may include an 802.11-compliant network, Bluetooth network, cellular digital packet data (CDPD) network, high speed circuit switched data (HSCSD) network, packet data cellular (PDC-P) network, general packet radio service (GPRS) network, 1xradio transmission technology (1xRTT) network, IrDA network, multichannel multipoint distribution service (MMDS) network, local multipoint distribution service (LMDS) network, worldwide interoperability for microwave access (WiMAX) network, and/or any other network that communicates using a wireless protocol.

While the network architecture 200 and/or portions thereof (illustrated or unillustrated in FIG. 2) may operate in various modes and include one or more types of networks, it may, in one embodiment, include a peer-to-peer wireless network. In the context of the present description, a peer-to-peer network is a network created between two or more nodes on an as-needed, sometimes temporary, basis. An important difference between peer-to-peer networks and traditional networks is the lack of substantial central administration or control over network principals.

In one exemplary type of peer-to-peer network, as defined above, an access point does not necessarily exist. Communications may take place in a peer-to-peer fashion directly between the nodes. Consequently, in such a peer-to-peer network, one of the peer nodes assumes some of the duties normally associated with an access point, such as sending out a beacon that advertises to other, nearby nodes the availability of the peer-to-peer network. Often, this beacon includes some network identify information [e.g. a service set identifier (SSID) in the parlance of an IEEE 802.11-compliant network, etc.] so that nodes (and their users) can distinguish between multiple networks that may overlap one another. One additional example of a peer-to-peer network, as defined above, is an ad-hoc network.

Still yet, the network architecture 200 and/or portions thereof (illustrated or unillustrated in FIG. 2) may, in various embodiments, include a centrally-based network, where nodes maintain connectivity to an access point. As compared to peer-to-peer networks where nodes communicate directly with each other, nodes in a centrally-based network pass data through a central access point.

In one exemplary type of centrally-based network, as defined above, the access point may not only mediate network traffic in the immediate neighborhood, but may also provide communication with a wired network. One additional example of such a centrally-based network, as defined above, is a network operating in an infrastructure mode.

In one illustrative example of use, a requesting node 224 may seek admission to the network architecture 200 and, in particular, a centrally-based wireless network thereof. That is, the requesting node 224 may seek to establish a bidirectional communication link with the access point 212 so that the requesting node 224 can gain access to the Internet 216 and/or other assets (e.g. one or more servers or databases accessible via the LAN 220). Further, in one embodiment, the access point 212 may require a key (e.g. WEP key, etc.) to authenticate the requesting node 224 before the access point 212 will grant such access. In various embodiments, the key may also be used to encrypt data and, in some cases, such encryption may constitute the exclusive use of the key. In the context of the present example, the requesting node 224 (and its user) typically does not presently possess such key. Consequently, the access point 212 may deny access to the requesting node 224.

The above situation may arise in any of a number of scenarios. For example, a user may have installed the network architecture 200 (or elements thereof) in his/her home or business. The requesting node 224 may be a guest's computer or other wireless device (e.g. a mobile phone or PDA). As such, the network owner may be willing to grant the requesting node 224 access to the network for the duration of the guest's stay but in order to do so will have to provide the requesting node 224 with the aforementioned key. In one embodiment, rather than (or in addition to) having to provide such one or more keys manually, the key(s) may be provided via a peer-to-peer wireless network that is established between the requesting node 224 and one of the other nodes of the network architecture 200. More information regarding various examples of this and related functionality will now be set forth in greater detail.

Figure 3:
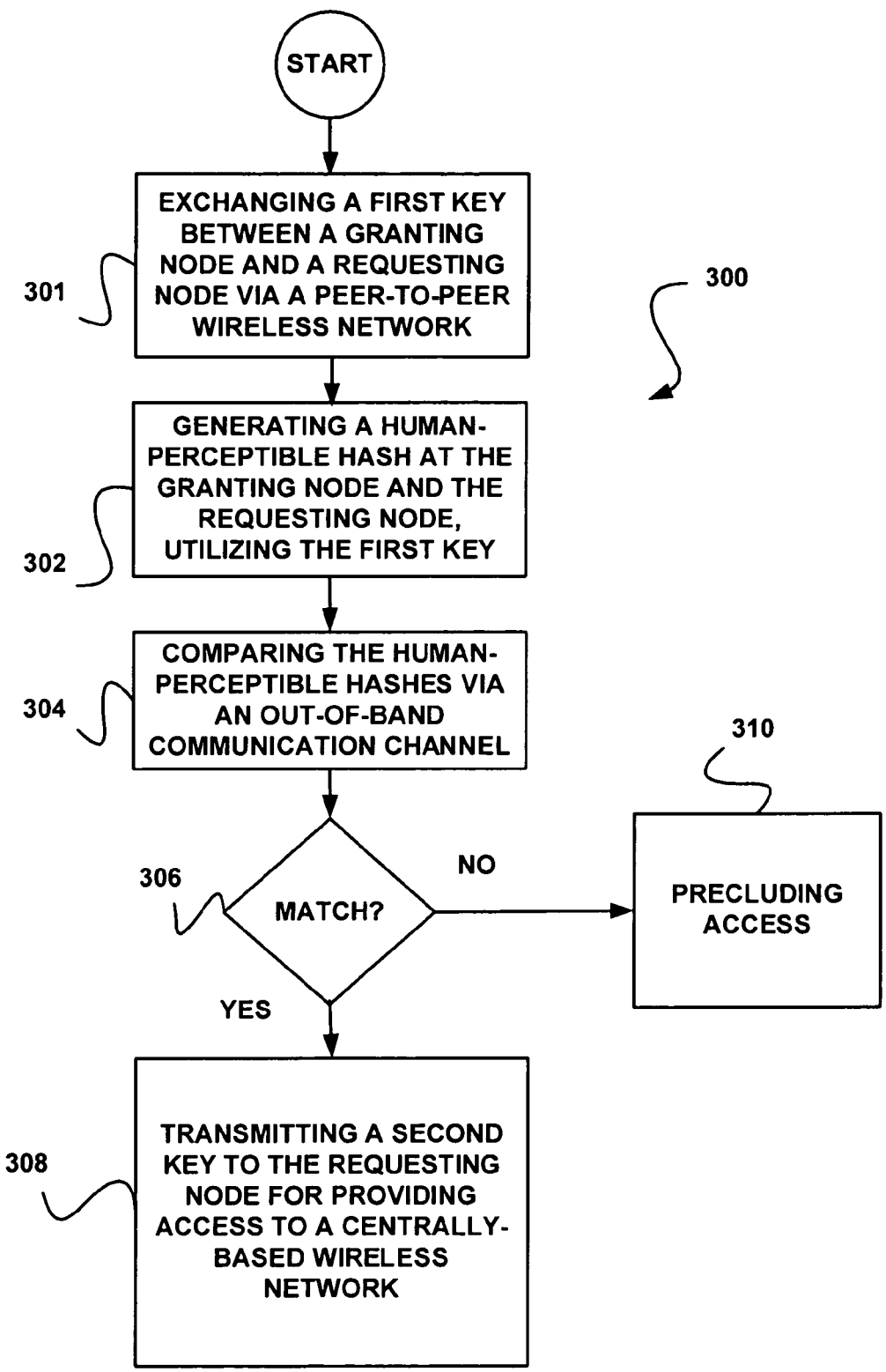
FIG. 3 illustrates a method for granting network access to a requesting node, in accordance with one embodiment.

FIG. 3 illustrates a method 300 for granting network access to a requesting node, in accordance with one embodiment. As an option, the present method 300 may be implemented in the context of the architecture and environment of FIG. 2. Of course, however, the method 300 may be carried out in any desired environment. Further, the various definitions set forth hereinabove may equally apply in the present description.

As shown, a first key is exchanged between a granting node and a requesting node via a peer-to-peer wireless network. Note operation 301. In the context of the present description, the granting node and requesting node may include any nodes including, but not limited to any of the nodes set forth hereinabove with respect to FIG. 2. Still yet, the granting node may refer to any node that is capable of granting, or at least partially contributing to the process of granting, network access to another node. Further, the requesting node may refer to any node at least potentially capable of such access.

Even still, the peer-to-peer wireless network may refer to any network meeting the definition set forth hereinabove. It should be also noted that, in the context of the present description, the term key may refer to any WEP key, WPA key (and/or passphrase, etc.), authentication information, credential-related information, and/or any other type of information capable of being used to enhance security in the network.

In one embodiment, the first key may be utilized to establish a secure communication channel between the granting node and the requesting node. The key and the secure communication channel may be established, for example, utilizing a transport layer security (TLS) session. Still yet, the first key provided to the requesting node may, but need not necessarily, be the same as the first key provided to the granting node. Of course, in one embodiment, the key generated during the secure exchange may be identical on both sides of the transaction. Even still, the term exchange may, but need not necessarily, imply that the first key is actually provided by the respective nodes; only that such key is received in some capacity that allows for its use. More illustrative information regarding such illustrative embodiment will be set forth during the description of subsequent figures. Of course, in the context of the present description, the first key may refer any key that is different from a second key that will be described hereinafter in greater detail.

Next, in operation 302, a human-perceptible hash is generated at the granting node and the requesting node, utilizing the first key. In the context of the present description, the term hash may refer to any key, authentication information, credential-related information, and/or any other type of information capable of being used to enhance security in the network. Further, similar to the first key, the human-perceptible hash generated by the requesting node may, but need not necessarily, be the same as the hash generated by the granting node. For example, a mere correlation may exist between the hashes, etc. Still yet, the human-perceptible hash may be generated in any desired manner that is at least partially a function of the first key.

In the context of one possible embodiment, the hash may optionally include a value that is derived from the key such that, for a given value of the key, the same hash is always generated. The hash, however, may have a lesser precision than the original key, which makes it possible for a human to easily and quickly compare two hash values to determine if the keys that generated the hashes are likely to be the same. To this end, in such embodiment, the hashed values may be traced back to the first key in a deterministic enough way that one can say with a high degree of certainty that the key is identical on both sides.

With the human-perceptible hash generated at each requesting/granting node, such hashes may then be compared via an out-of-band communication channel. See operation 304. The out-of-band communication channel may, in the context of the present description, refer to any channel other than that/those by which the first key was exchanged. For example, in the context of the aforementioned embodiment, such out-of-band communication channel may refer to a channel other than the secure communication associated with the TLS session.

To this end, it may be determined whether the hashes match, or at least correlate to some human-perceptible extent. Note decision 306. If decision 306 results in an affirmative response, a second key may then be transmitted to the requesting node for providing access to a centrally-based wireless network based on the comparison. Note operations 308 and 310. Again, such centrally-based wireless network may refer to any network that meets the appropriate definition set forth hereinabove. Further, the second key may refer to any key other than the first key set forth hereinabove, and which provides access to the centrally-based wireless network.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
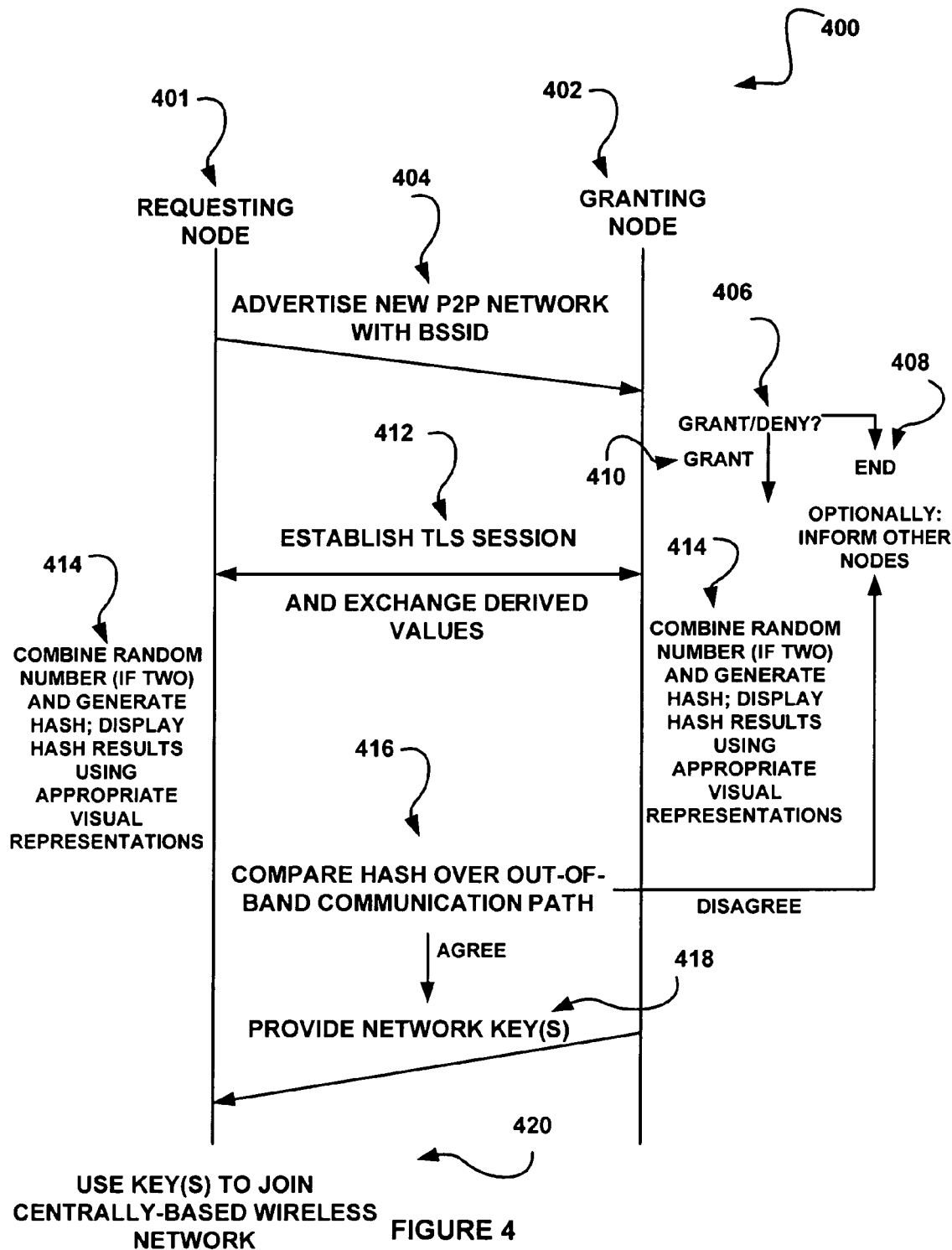
FIG. 4 illustrates a flow of a process for granting network access to a requesting node, in accordance with another embodiment that is merely exemplary in nature.

FIG. 4 illustrates a flow 400 illustrating a process for granting network access to a requesting node, in accordance with another embodiment that is merely exemplary in nature. As an option, the present flow 400 may be implemented in the context of the architecture and environment of FIG. 3. Of course, however, the flow 400 may be carried out in any desired environment.

As shown, a communication protocol is provided for a key exchange that is to occur between a granting node 402 (e.g. see, for example, one of the nodes 214A-214C of FIG. 2), and a requesting node 401 (e.g. see, for example, the requesting node 224 of FIG. 2). In some embodiments, any of the nodes that are capable of establishing a peer-to-peer wireless network with the requesting node 401 (and that is configured with computer-readable instructions implementing the methods herein described) can serve as a granting node. For reasons that will soon become apparent, the node that serves as the granting node 402 (i.e. to pass the network key(s) to the requesting node 401) may optionally be equipped with some form of display device that can be read and understood by a human user (other than the user operating the requesting node 401). The same is also true of the requesting node 401, as will become evident below.

In order for the aforementioned communication to may be carried out in accordance with the flow 400 of FIG. 4, the various nodes may be adapted to listen passively (or sometimes actively search for) available peer-to-peer/centrally-based wireless networks. Such capability may be used to begin the process of a key exchange. For example, as the requesting node 401 is brought within the coverage area of a centrally-based wireless network, the requesting node 401 may recognize the existence of that network either through passively scanning or actively searching therefor. The requesting node 401 may then alert its user as to the existence of the network and seek an indication from that user as to whether or not the requesting node 401 should join the centrally-based wireless network.

In accordance with one embodiment, such an inquiry may be presented to the user via a pop-up window or other display device on the requesting node 401. The user may respond and indicate his/her request to join (or not join) the centrally-based wireless network by selecting an appropriate button or other element included in such a display device using a cursor control device (e.g. mouse, etc.) or other input mechanism. Of course, many other prompting mechanisms may be used and the precise form of interaction may depend on the nature of the node seeking to join the centrally-based wireless network. For example, if the requesting node 401 is a mobile phone, the prompt may be displayed using the phone display, but the input mechanism may be one of the keypad buttons. The precise mechanism by which the user is advised on the availability of the centrally-based wireless network, and afforded the opportunity to join/not join may take any form.

For purposes of the present example, assume that the user indicates a desire to join the centrally-based wireless network (if the converse is true, no further action need be taken). Recall that, in order to do so, the requesting node 401 may need to obtain the appropriate keys to authenticate itself to an access point of the centrally-based wireless network. Therefore, in order to obtain those keys, the requesting node 401 now advertises the availability of a new peer-to-peer wireless network of which it is a member. See operation 404.

In one embodiment, the SSID (i.e. the name) of this new peer-to-peer wireless network (which is advertised by the requesting node 401) is of the form set forth in Table 1.

TABLE 1

NWR-[CPTR NAME][SEQ. NO.] [HBSSID]
where:
    NWR is a prefix used to indicate the special nature of the peer-to-peer wireless network being advertised (i.e. one which is to be used for the exchange of authentication credentials);
    [CPTR NAME] is an identifier associated with the requesting node 401 (e.g. the name of the requesting node 401, the user's log-in name, or some other criteria that is identifiable by the user of the granting node 402; in one embodiment, this name is shown on the display associated with the granting node 402 so that the user thereof can understand who is seeking to join the wireless network);
    [SEQ. No.] is a sequence number, which need only be a single byte long, used to prevent redundant messages from being acted upon; and
    [HBSSID] is a hash of the BSSID (i.e. the name) of the centrally-based wireless network which the requesting node is seeking to join (it is also the MAC address of the access point advertising that the centrally-based wireless network).

Of course, this is only an example of the network identifier that could be used and many other forms of such identifiers exist. The precise nature and make up of the identifier may take any form.

Upon recognizing and connecting to the new peer-to-peer wireless network advertised by the requesting node 401, the granting node 402 may prompt its associated user as to the existence of the requesting node 401 and inquire as to whether or not that user wishes to grant or deny the requesting node 401 access to the existing centrally-based wireless network. See decision 406. This assumes that the user associated with granting node 402 has sufficient authority to make such a decision. In some cases, it may be necessary to restrict such authority to a subset of users or to a network administrator. In such cases, the granting node 402 may be precluded from engaging in any exchange with requesting node 401 or may advise the requesting node 401 of the need to contact an appropriate granting node. This exchange may or may not occur with human interaction.

The foregoing role of administrator, when used, may, in one embodiment, fall to a first node to join the centrally-based wireless network and thereafter may rotate to other nodes (e.g. according to the sequence in which they joined network, etc.), as current administrator nodes leave the network. So that each of the nodes of network is kept appraised of the current network configuration, the current administrator node may distribute information (e.g. logs showing which nodes are presently part of the network, when new nodes were added, etc.) to the other nodes on an as-needed and/or periodic fashion. Such distributions can be made via peer-to-peer wireless networks established for such a purpose or via an access point. In some embodiments, the access point may store a master administration table that can be downloaded to one or more nodes as they join the network or as the need to change administrators arises.

In some cases, it may be that a current administrator node is incapable of forming a peer-to-peer wireless network with a current requesting node 401. For example, the two nodes may be too far apart geographically to form a reliable wireless communication link. In such situations, if another node is aware that the requesting node 401 is broadcasting an available peer-to-peer wireless network of the type used to exchange authentication credentials, that node may seek permission from the current administrator to act as the granting node 402 to admit/deny access to the requesting node 401. Alternatively, the node may act as a relay (or wireless bridge) between the current administrator node and the requesting node 401.

Assuming the user of granting node 402 does have the authority to decide whether or not to grant access to the requesting node 401, if that user denies such access (see operation 408), such decision may be communicated to all of the other nodes of the centrally-based wireless network. Thus, if the requesting node 402 attempts to access the centrally-based wireless network via another granting node, the earlier decision can be referenced by informing such nodes.

The present example, however, assumes that the user of the granting node 402 will grant the requesting node 401 access, per operation 410. Upon such an indication by the user (e.g. through selection of an appropriate button or other display element, for example using a cursor control device or other appropriate input mechanism) of the granting node 402, a TLS session between the granting node 402 and requesting node 401 is established over the peer-to-peer wireless network advertised by requesting node 401. See operation 412. To accomplish this, a key necessary for such session is thus conditionally exchanged in response to the request by the requesting node 401.

The TLS protocol is a communications protocol defined in Request for Comments (RFC) 2246 of the Internet Engineering Task Force (IETF), published January 1999. This communication protocol is used to provide privacy and data integrity between two communicating applications (i.e. software applications running on two nodes in communication with one another). It is a communication protocol often used in connection with Internet and other communications and, for purposes of this disclosure, the entire contents of RFC 2246 are incorporated herein by reference. The TLS protocol thus provides a mechanism for (1) the generation and exchange of information which is used to ensure the identity of the granting and requesting nodes, and (2) the secure exchange of security information (in one embodiment, cryptographic keys such as WEP/WPA keys, passphrase, etc.) between two nodes once such identity has been assured.

In the present embodiment, the exchange of WEP/WPA keys, passphrase, etc. is contemplated to enable the TLS session. However, the present technology is not limited to the exchange of such keys and may also be used to exchange other cryptographic keys or authentication information. Moreover, protocols other than the TLS protocol may be used. For example, the Diffie-Hellman or other secure communication protocol may be used for the exchange of information to be used in creating a secure communication session for the eventual exchange of security information.

As described more fully below, a common hash is developed in a manner that is integral with the establishment of the communication channel via the TLS session, where such hash can only be known by the requesting node 401 and the granting node 402. Verification of this hash occurs over an out-of-band communication channel. Once the granting and requesting nodes have been so authenticated, the present embodiment makes use of the TLS or other secure information exchange protocol to provide the requesting node 401 with, for example, the keys needed to access the centrally-based wireless network of which the granting node 402 is a part and/or the keys used to encrypt data to be communicated within that centrally-based wireless network (which, in general, may be the same or different than the access keys).

Specifically, with reference again to FIG. 4, before any exchange of authentication/decryption information that relates to the centrally-based wireless network, the granting node 402 may be provided with some assurance that the requesting node 401 is the node it purports to be (and, in general, vice-versa), as set forth above. This is accomplished through an out-of-band communication channel and a comparison of information that is only known by the requesting n node 401 and the granting node 402. In one embodiment, this information takes the form of a human-perceptible hash. The human-perceptible hash may itself be a product of the establishment of the communications channel between the granting node 402 and the requesting node 401 via a convenient communication protocol (e.g. the TLS communication protocol).

To prevent eavesdropping, the human-perceptible hash may, in one embodiment, include a hash that itself is not transmitted wirelessly over the air. Instead, it may be independently developed by each of the granting node 402 and the requesting node 401, and then compared over the out-of-band communication channel. For example, in one embodiment, the human-perceptible hash is developed as follows using various values (e.g. numbers, alphanumeric values, etc.).

First, each node participating in the communication (e.g. the requesting node 401 and the granting node 402, in the present example) generates a random value. Specifically, the requesting node 401 generates a first random value and the granting node 402 generates a second random value. Each node then uses its random value to produce a derived value. The derived value may, in general, be the node's random value that has been transformed using a mathematical operation or algorithm. In particular, the requesting node 401 generates a first derived value utilizing the first random value, and the granting node 402 generates a second derived value utilizing the second random value.

Each node sends its individual derived value to the other. In particular, as part of the TLS exchange, the granting node 402 sends its derived value to the requesting node 401. In response, the requesting node 401 sends its derived value back to the granting node 402. Note, again, operation 412.

Each node may then combine the other's derived value with that node's own random value to generate the human-perceptible hash. Specifically, the requesting node 401 combines the second derived value with the first random value. Further, the granting node 402 combines the first derived value with the second random value, for display purposes. See operation 414. This combination may be carried out in any desired manner (e.g. a concatenation, addition, subtraction, exclusive OR, etc.) to produce a result, namely the human-perceptible hash.

In various optional embodiments, the mathematical operations or algorithms that are involved in the aforementioned combining may conform to the following properties. The derived value is not easily reversible, i.e. it is computationally very difficult to derive the original random value from the derived value. The combination operation may be symmetric (i.e. when the requesting node 401 takes its random value and combines it with the derived value from the granting node 402, this yields the same result as when the granting node 402 takes its random value and combines it with the derived value from the requesting node 401). There is no easy way to obtain the resulting key by observing only the two derived value (e.g. in the event of snooping on the peer-to-peer wireless network). An example of an algorithm with these properties is the Diffie-Hellman algorithm.

The goal may now be to compare the human-perceptible hash produced at each node to ensure that they are the same. Note operation 416. It should be noted that either node may decide to terminate the present method, based on the comparison. This prevents a user from joining a rogue network when intending to join a real network. In the case where a joining user terminates, there may be no need for a notification on the network.

This may provide assurance that the nodes are communicating with each other (and not some rogue node). While it is possible to simply display the keys in alphanumeric form at each of the requesting node and granting node, one embodiment provides a more user-friendly method for completing this task.

Specifically, at each node, the human-perceptible hash may be subjected to a hash function and the corresponding outputs thereof may be separately displayed to the users of the two nodes. In some cases, the hash results (e.g. which may be used to index a lookup table or other storage mechanism to retrieve a target value or image, etc.) may be values, but in other embodiments, the results may be displayed as corresponding graphical images. For example, they may be displayed as shapes, dice, playing cards (e.g. images which may be retrieved from the lookup table or other storage indexed by the hash results, etc.). Of course, combinations of any or all of these images or any other images may be used.

Now, to confirm that the communication is actually occurring between the intended nodes (and not some "man in the middle" or other interloper), the two users may engage in a challenge and response colloquy making use of the hash. For example, because of the limited range of 802.11-compliant and other wireless networks, it is possible that the two users may be in close physical proximity to one another. As such, the two may compare the hash results to one another either visually or in some other fashion (e.g. audibly, etc.).

In one embodiment, the visual indicators of the challenge/response sequence may be displayed within pop-up windows or other suitable display mechanism at the respective nodes. If graphical displays are not available, audible tones/sounds, a sequence of flashing lights, and/or other indicators may be used which provide each of the human users with the same or correlating identifiers so that they can use the out-of band communication channel (e.g. visual confirmation or a face-to-face, other conversation, etc.) to be assured that the nodes communicating over the peer-to-peer wireless network are the nodes they purport to be and that no "man-in-the-middle" has compromised the key exchange process before the granting authorizes the exchange of the keys for the centrally-based wireless network.

For example, if the hash results are represented as two playing cards (e.g. a Jack of Hearts and a Two of Spades), one user (e.g. the user of the granting node 402) may challenge "Two of Spades," to which the other user (e.g. the user of the requestor node 401) responds "Jack of Hearts." If the response is incorrect or the cards (or other hash results) do not agree, this is an indication that something has gone wrong in the communication over the peer-to-peer wireless network.

For instance, it may indicate that somehow a rogue node has intervened in the communication path and is attempting to steal the keys to the (secure) centrally-based wireless network. Under such circumstances, the communication over the peer-to-peer wireless network may be terminated without providing the keys to the centrally-based wireless network. It should be noted that a challenge-response exchange is not strictly necessary as it is only required that the two entities agree that each has received the same or correlating hash.

Where, however, the challenge/response test is successful, this is an indication that a secure TLS session between the requesting node 401 and the granting node 403 has been established. The human-perceptible hash generated by each node, or any other key for that matter, may thus be used as a session key to encrypt the data that actually transfers the centrally-based wireless network key(s) from the granting node 401 to the requesting node 401. Note operation 418.

Thus, the peer-to-peer wireless network may be employed to first exchange information used to authenticate the requesting and granting nodes, and the out-of-band communication may be employed to confirm the identity of those nodes prior to the key exchange for providing access to the centrally-based network. In some cases, it may be only the requesting node 401 or the granting node 402 (and not both nodes) which provide random values to be used to generate the challenge/response hashes. In any event, upon receipt of the keys, the requesting node 401 may join the centrally-based wireless network in the conventional fashion. Further, the peer-to-peer wireless network can be torn down after the key exchange has been completed.

Figure 5:
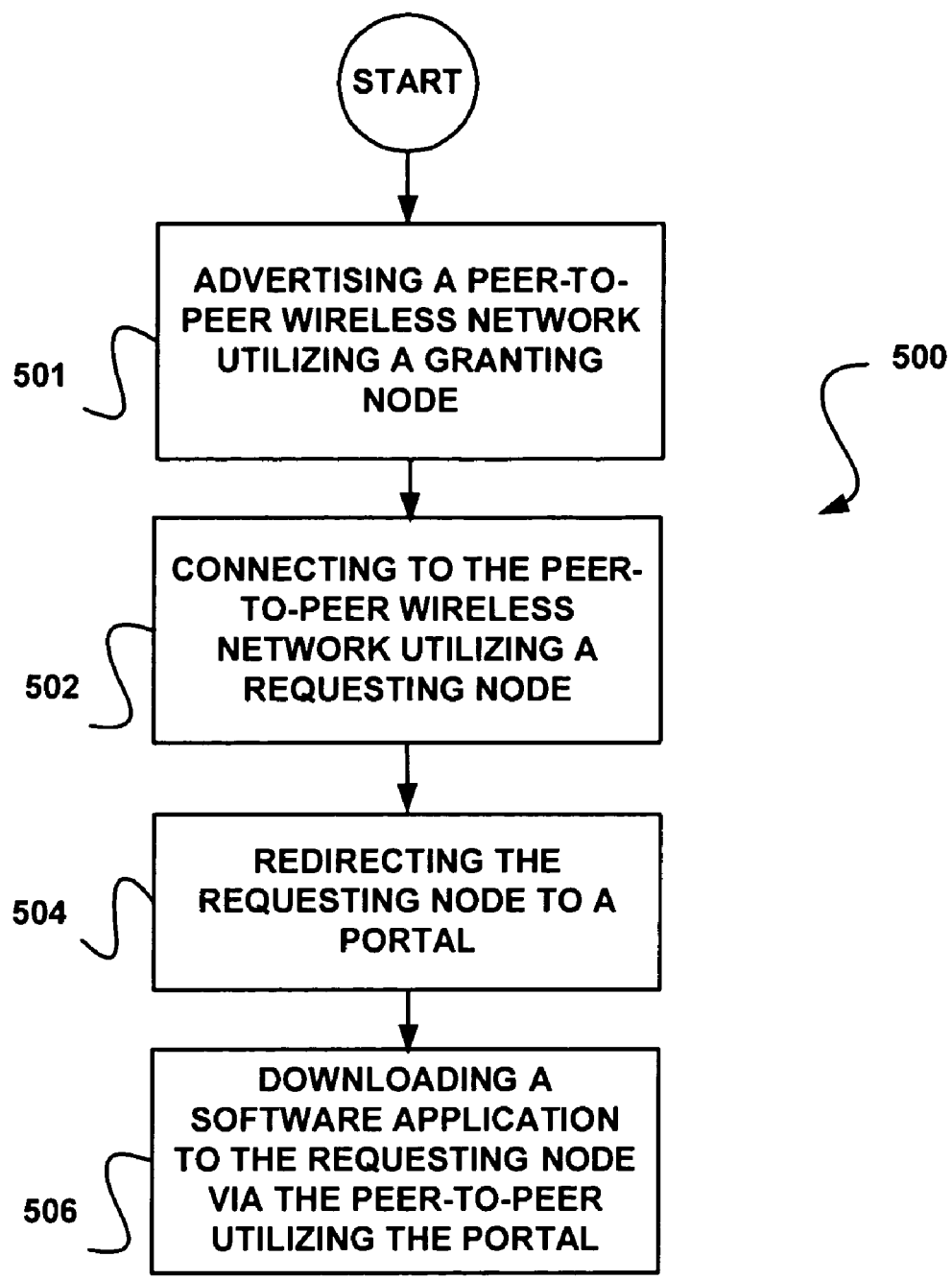
FIG. 5 illustrates a method for downloading a software application in a peer-to-peer wireless network, in accordance with one embodiment.

FIG. 5 illustrates a method 500 for downloading a software application in a peer-to-peer wireless network, in accordance with one embodiment. As an option, the present method 500 may be implemented in the context of the architecture and environment of FIGS. 3-4. Specifically, the software application downloaded via the method 500 may be capable of equipping a node with the functionality set forth in FIGS. 2-4. Of course, however, it should be noted that the method 500 may be carried out in any desired environment. Further, the various definitions set forth hereinabove may equally apply in the present description.

As shown, a peer-to-peer wireless network is advertised utilizing a granting node. Note operation 501. In the context of the present description, such advertisement may take any form capable of allowing a requesting node to identify the peer-to-peer wireless network.

Next, in operation 502, the requesting node connects to the peer-to-peer wireless network. Such connection may take the form of an automatic and/or manual identification and/or selection of such network.

In operation 504, the requesting node may be redirected to a portal. Such redirection may refer to any operation that results in the requesting node being provided with access to the portal. Further, such portal may include any interface or even a graphical user interface that provides the requesting node with access to the software application. In an embodiment where the portal includes a graphical user interface, the graphical user interface may be capable of being used for allowing a user of the requesting node to approve and/or prompt the download of the software application.

In various exemplary embodiments, the redirecting may occur under automated and/or manual control either under the direction of the granting node or any other node, for that matter. For instance, the redirecting may occur in response to any request received from the requesting node, an opening of a network browser utilizing the requesting node, and/or a request from the requesting node to access a centrally-based wireless network. In one embodiment, the redirection may involve the redirection of a network browser of the requesting node to a particular web page. More illustrative information regarding such optional redirection techniques will be set forth during the description of subsequent figures.

Thereafter, in operation 506, a software application is downloaded to the requesting node via the peer-to-peer network utilizing the portal. It should be noted that, in the context of the present description, the software application may refer to any software program that implements any desired functionality. Further, the software application may take any form such as a self-executing applet (or any other script), a program that requires a separate installation process on the requesting node, and/or any other software, for that matter.

However, in accordance with one optional embodiment, the software application may be necessary for allowing the requesting node to gain access to a centrally-based wireless network. Specifically, in one embodiment, the software application is adapted for carrying out the functionality of the method 300 and flow 400 of FIGS. 3 and 4, respectively, so that the appropriate key exchange described therein may take place over the present or other peer-to-peer wireless network.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 6:
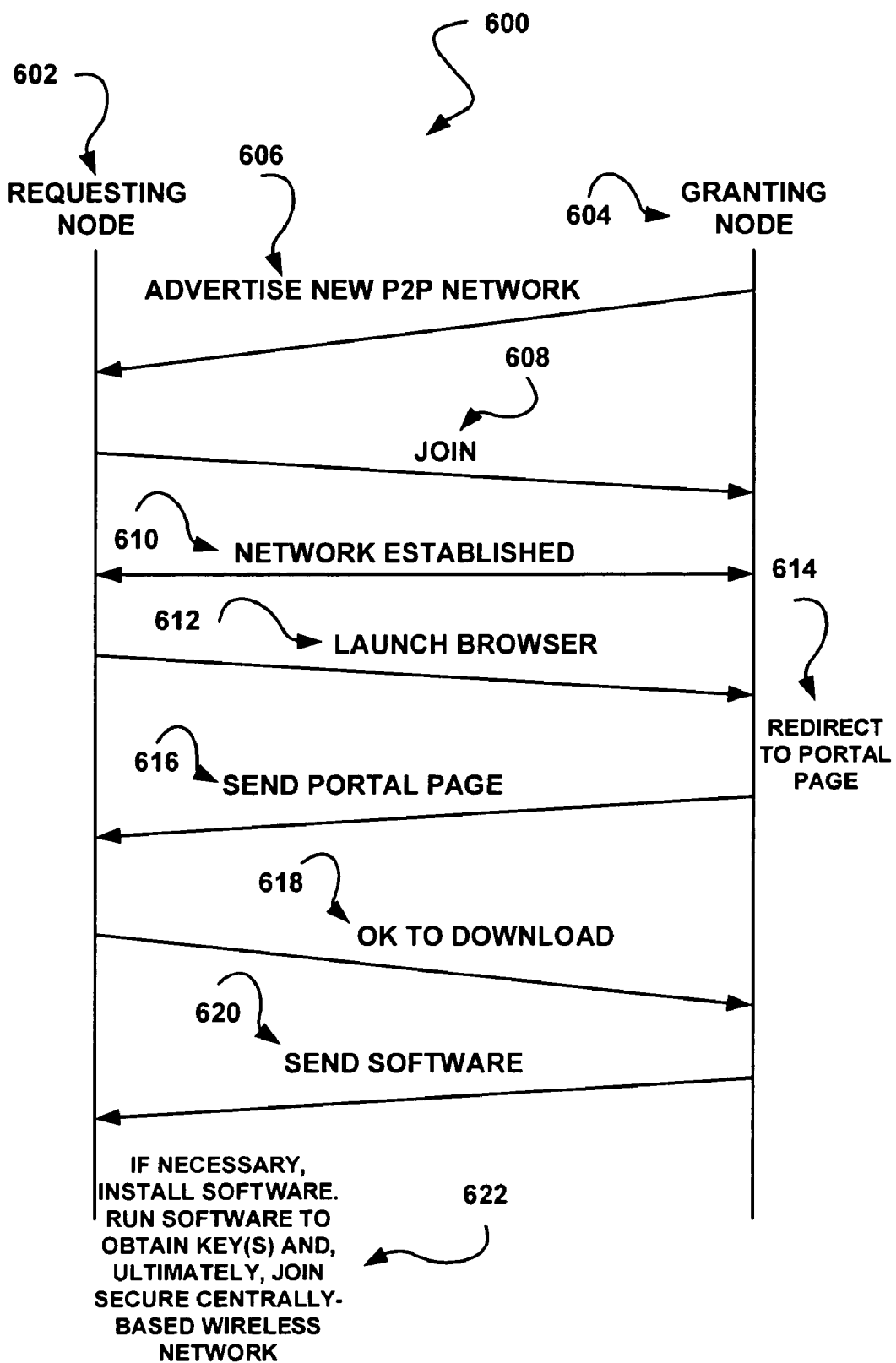
FIG. 6 illustrates a flow of a process for downloading a software application, in accordance with another embodiment that is merely exemplary in nature.

FIG. 6 illustrates a flow 600 of a process for downloading a software application, in accordance with another embodiment that is merely exemplary in nature. As an option, the present flow 600 may be implemented in the context of the architecture and environment of FIG. 5. Of course, however, the flow 600 may be carried out in any desired environment.

As shown, a granting node 604 advertises a peer-to-peer wireless network over which the software application may be downloaded. See operation 606. Such peer-to-peer wireless network may be given a special SSID so that the user of a requesting node 602 may know to join such peer-to-peer wireless network per operation 608, rather than attempting to join a secure centrally-based wireless network which is likely to also be recognized by the requesting node 602. It should be noted that the aforementioned advertisement of operation 606 and identification of such advertisement may mimic operation 404 and the related active/passive scanning discussed hereinabove during reference to FIG. 4.

In some cases, it may be desirable for an access point to be configured such that, if the requesting node 602 seeks to join the secure centrally-based wireless network and does not have the proper authentication credentials, the access point directs the requesting node 602 to a captive portal which, in one embodiment, may include a Web page or the like explaining that the user should first join the peer-to-peer wireless network advertised by the granting node 604 to obtain the necessary software application needed to request the key, etc. The requesting node 602 may thus seek to join the peer-to-peer wireless network advertised by the granting node 604 and, together, the requesting node 602 and the granting node 604 may establish bidirectional communication. See operation 610.

To accomplish this, the granting node 604 may be configured to emulate all necessary network infrastructure to establish TCP/IP connectivity. At a minimum, in accordance with one embodiment, it should be able to grant a dynamic IP address [using the Dynamic Host Configuration Protocol (DHCP) protocol] to the requesting node 602 if such node should demand one. The granting node 604 may emulate other configuration protocols, such as Point-to-Point Protocol over Ethernet (PPPoE), etc., as well.

Thus, in response to the user of the requesting node 602 launching a browser application or any other action per operation 612, the granting node 604 redirects the request for a Web page to the above described captive portal in operation 614. The granting node 604 then sends a portal page advising the user of the need to download the software application. Note operation 616.

In the context of the present example of FIG. 6, the captive portal includes a server-like source of one or more Web pages and associated content to which new requesting nodes seeking to join the peer-to-peer wireless network are referred, regardless of the web page the requesting node 602 actually requested. Thus, the captive portal may act as a redirector such that when a Web browser requests a particular web page (e.g. the page configured as the browser's home page), that request is automatically redirected to the start page of the captive portal. In one embodiment, the redirection may be a Web page stored at the granting node 604. In other embodiments, the portal page may be stored at an access point (or another node of a network and even an Internet site), and retrieved by the granting node 604 on an as-needed basis.

Once the user indicates his/her desire to so download the software application (e.g. by selecting an appropriate button or other element displayed as part of the portal page, etc.) per operation 618, the granting node 604 sends the software application to the requesting node 602. See operation 620. In some cases, the software application may be a Java applet or other application configured to run in the browser of the requesting node 602. In other embodiments, the software application may need to be separately installed and launched at the requesting node 602. In either case, once the software application is executed, the requesting node may perform the functions needed to obtain the key(s) for the secure centrally-based wireless network, as described above in reference to FIGS. 3-4 et al. Note operation 622.

The aforementioned software application may thus be generally useful within home or enterprise networks, as it reduces reliance on connectivity to the Internet and also conserves bandwidth for such connections. While the nature of the captive portal and its use in the exchange of network security information is set forth herein, it should be again noted that the use of this example is not meant to limit in any way the applicability of the present flow 600 to the exchange of other information and/or software.

Figure 7:
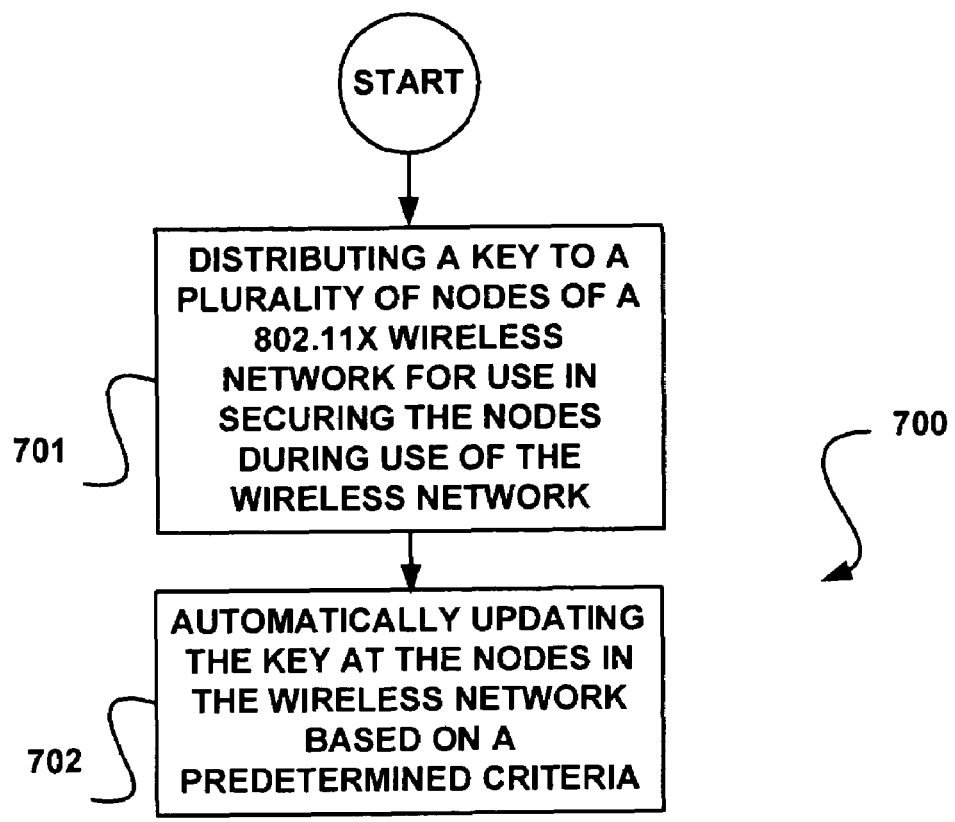
FIG. 7 illustrates a method for updating keys in a wireless network, in accordance with one embodiment.

FIG. 7 illustrates a method 700 for updating keys in a wireless network, in accordance with one embodiment. As an option, the present method 700 may be implemented in the context of the architecture and environment of FIGS. 1-6. For example, the updating associated with the method 700 may be carried out by a software application downloaded by way of the methods 500 and 600 of FIGS. 5 and 6, respectively. Of course, however, it should be noted that the method 700 may be carried out in any desired environment. Further, the various definitions set forth hereinabove may equally apply in the present description.

As shown, a key is first distributed to a plurality of nodes of a 802.11 wireless network for use in securing the nodes during use of the wireless network. Note operation 701. In the context of the present description, 802.11 refers to the group of specifications for wireless networks developed by the Institute of Electrical and Electronics Engineers (IEEE) 802.11 for specifying an over-the-air interface between a wireless client and a base station or between two wireless clients. Further, the term 802.11 refers to any and all of both currently available and unforeseeable members of the relevant family of wireless communication standards or "languages" (e.g. 802.11a, 802.11b, 802.11g, etc.).

Still yet, it should be noted that the one or more keys may be distributed automatically and/or manually, and/or passively and/or actively by way of any network-based and/or manual technique. Further, in the context of the present description, the term securing includes authenticating the nodes, encrypting communications between a plurality of the nodes, and/or any other technique for enhancing security with respect to any aspect associated with the nodes. Even still, as noted earlier, the term key may refer to any WEP key, WPA key/passphrase, authentication information, credential-related information, and/or any other type of information capable of being used to enhance security in the network.

Next, in operation 702, the key is automatically updated at the nodes in the wireless network, based on predetermined criteria. To this end, the key is less likely to be compromised by a hacker, etc., thus enhancing security. It should be strongly noted that the key may be updated in any way that replaces, alters, and/or otherwise provides a key with enhanced security. Thus, the following updating techniques are set forth for illustrative purposes only and should not be construed as limiting in any way.

In accordance with one embodiment, the key may be rotated on a periodic or other basis so as to avoid reuse of the same. By rotating the key in this fashion, the opportunities for hackers to recover (e.g. through network traffic monitoring, etc.) and use the key in a malicious or unauthorized fashion are greatly reduced. Legacy 802.11 networks and equipment may therefore be deemed somewhat less vulnerable to attack than might otherwise be the case if only conventional WEP or WPA protocols are used.

Key rotation in accordance with one embodiment may be based on a key schedule that is shared with nodes of a wireless network or on a key progression that makes use of a pseudo-random value generator or function to produce a new key. In a first example, a network node (e.g. a client or an access point) may issue (e.g. periodically or according to some other schedule) a group of keys to all current nodes (as well as the access point) of a wireless network. New nodes may be appraised of this group of keys when they initially join the network.

Thereafter, the current key used within the wireless network may be updated on a periodic or other basis (e.g. in response to an instruction from the access point) by using the next key in the group of keys. The precise nature by which the next key from the list is used may be carried out in any desired manner such that, at various times in the operation of the wireless network, the current key used by the nodes thereof is updated to another one of the keys in the previously distributed list. Such lists may be distributed as often as needed, or at least as frequently as some predetermined schedule (e.g. hourly, daily, weekly, etc.).

In other embodiments, rather than distributing a list of keys, the access point or other administrator node may distribute a seed value for a pseudo-random value generator and thereafter use keys in the sequence produced by the pseudo-random process. In this case, a node would need only to know the initial seed value and the time between key updates. So long as each node executes the same pseudo-random process (a situation which could be assured through the use of a common application program running on each node of the wireless network), a node may always generate the appropriate key by simply referring to the current date/time and the key rotation schedule.

Where such key rotation methods are used, it may also be beneficial to include a technique for nodes that are rejoining a network to rapidly acquire the appropriate key. That is, owing to differences between time bases in different nodes, it is possible, in fact likely, that a node seeking to rejoin a wireless network that it has been away from may not be able to immediately determine the appropriate key to be used to join the wireless network. Rather than have the node search through a key list or generate successive keys using its pseudo-random process, the access point may broadcast a hint to the rejoining node which informs that node where the network is in terms of the rotating key sequence. Of course, this "hint" should reveal no information about the actual key being used to prevent eavesdroppers from being able to regenerate the key.

In one embodiment, the hint may be broadcasted in the form of an updated SSID. The SSID is essentially the name of the network broadcasted by the access point. If a portion of the SSID (e.g. for example, a single or several character suffix) contains the index of the key in the schedule, modulo the precision of the suffix, the rejoining node may be able to rapidly synchronize itself to the time base used by the access point in terms of where the access point currently is in the key rotation scheme. The rejoining node can then update its authentication keys appropriately and proceed with rejoining the network. Optionally, the rejoining node can resynchronize its time base to that of the network.

In the event a node is joining a network for the first time (and therefore does not have the software required to work with the rotating key schemes described herein), that node may be provided with the then-current key and be permitted to join the network after it has been properly authenticated. One mechanism by which such authentication can occur is described hereinabove during reference to FIGS. 2-4 et al. After joining the network (or, indeed, as part of the joining process), the node may download the software application needed to comply with the key rotation scheme (and/or the authentication process itself) in accordance with the methods described hereinabove during reference to FIGS. 5-6 et al.

In various embodiments, it may be desirable to have some administration mechanism in place so that multiple nodes of a network do not try to enforce key rotation policies at the same time. Accordingly, among the various nodes of a network, an "administrator" may be appointed. Such administrator may be appointed and maintained in the manner set forth hereinabove during reference to FIG. 4.

Thus, a technique for updating keys for wireless networks has been described. Although discussed with reference to various presently contemplated embodiments, it should be remembered that the present embodiments are not intended to be limited thereby. For example, where an access point is not presently equipped to perform key updating as discussed herein, a client computer may be configured to handle such matters. In one such exemplary situation, when it comes time (based on the updating schedule) to update the key, the existing node within the network may negotiate amongst themselves to determine a "master" node to handle the key updating. Once an appropriate node "wins" this negotiation, it may reprogram (through one or more conventional access point management interfaces) all access points on the network with the updated key (and new SSID if that too is to be changed). Once the access point(s) are reprogrammed, all nodes will see the new SSID and automatically move to connect to the new network with the updated key. This way, the process is carried out without the need for any specialized hardware, in some embodiments.

Figure 8:
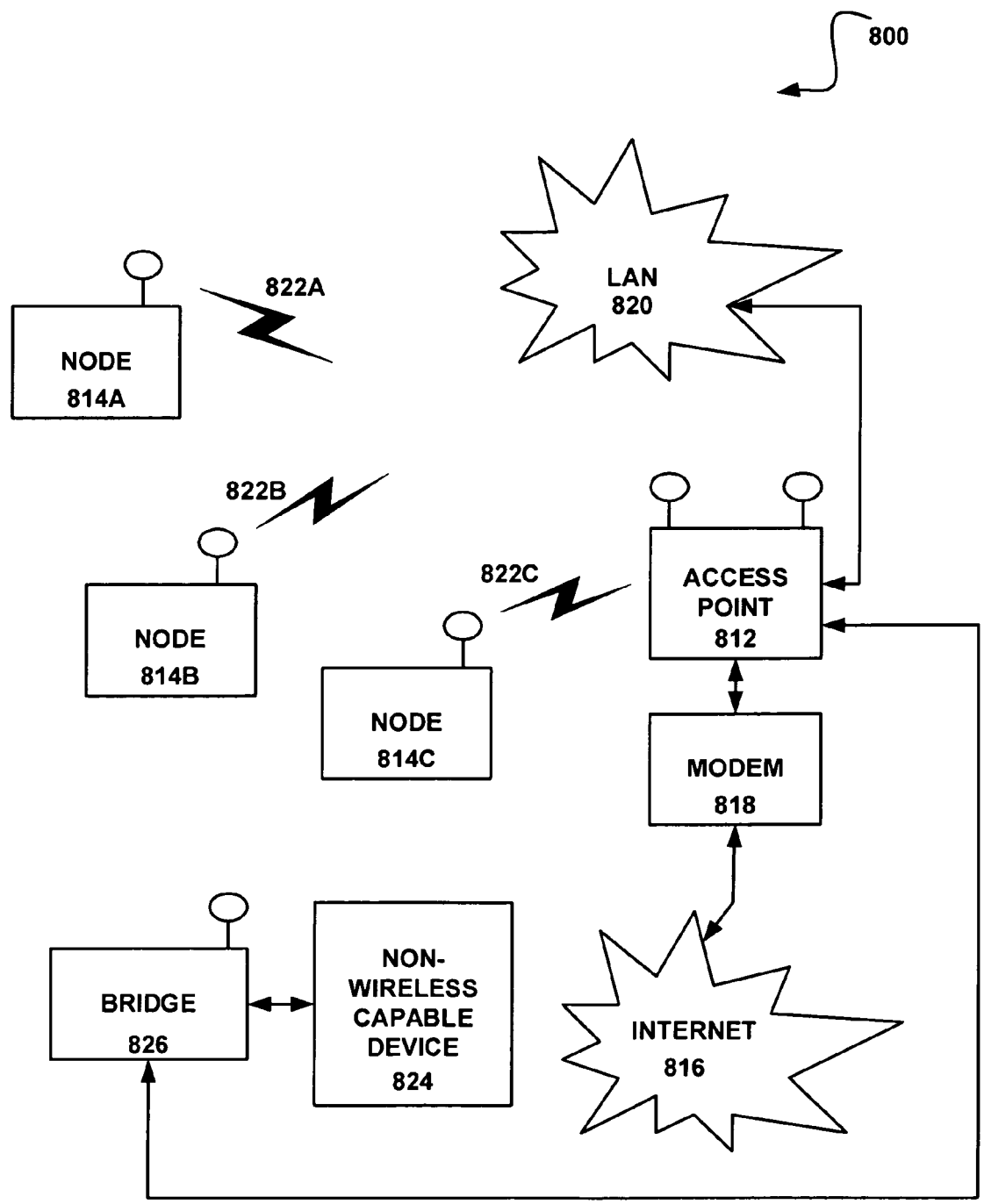
FIG. 8 illustrates a system including a security-enabled bridge device, in accordance with one embodiment.

FIG. 8 illustrates a system 800 including a security-enabled bridge device, in accordance with one embodiment. As an option, the present system 800 may be implemented in the context of the architecture and environment of FIGS. 1-7. Of course, however, the system 800 may be carried out in any desired environment. Further, the various definitions set forth hereinabove may equally apply in the present description.

As shown, the system 800 includes an access point 812 and three wireless nodes 814A-814C. Access to the Internet 816 may be provided via a modem (e.g. an xDSL or cable modem, etc.) 818 connected to access point 812, in which case access point 812 may also serve as a router, etc. Similarly, the access point 812 may serve as a bridge to a LAN 820, which may include unillustrated non-wireless nodes such as printers, scanners, personal computers, etc. The wireless network may be made up of wireless communication links 822A-822C between each of the wireless nodes 814A-814C and the access point 812.

In one example of use of the system 800, a network administrator or other user may want to include a non-wireless capable device 824 (e.g. a television set, music player, camera, scanner, or other device) in the system 800. In other embodiments, the device 824 may be wireless capable, but legacy in nature. That is, the device 824 may be incapable (without the use of the bridge discussed below) of being programmed to include the functionality described herein.

One possibility might be to attach the device 824 to the LAN 820 (e.g. using an Ethernet connection, etc.). This solution, however, presents difficulties. For example, running additional cables to accommodate the new device 824 may be physically impossible or at least impractical. Further, the user may simply lack sufficient knowledge to incorporate a wired LAN 820 with the wireless network.

In one embodiment, a bridge 826 may be provided which is capable of communication with the non-wireless capable (and/or legacy) device 824 and a wireless network (e.g. a peer-to-peer wireless network, a centrally-based wireless network, etc.). Further, the bridge 826 may incorporate security functionality for remotely and automatically securing the non-wireless capable device 824 (which may, at least partially lack such security functionality, etc.) during use of the wireless network.

In various embodiments, such security functionality may include any of functionality discussed hereinabove with respect to FIGS. 1-7 with or without the inclusion of the remaining features disclosed therein. Just by way of example, such security functionality may include the function associated with the aforementioned requesting node and/or granting node, such that, for instance, the bridge 826 serves as a requesting node and/or granting node. In another embodiment, the bridge 826 may be configured by a computer containing the software application mentioned in previous figures. In other words, rather than autonomously participating in a security scheme, the bridge 826 may act as a passive entity which may be given specific configuration instructions by a computer which is an active participant in the security scheme, etc.

In yet another exemplary embodiment, the bridge 826 may include a small device that may be connected to the non-wireless capable device 824 through a conventional wired connection (e.g. an Ethernet connection, USB connection, serial connection, parallel port connection, Fire Wire connection, etc.). In essence, the bridge 826 may include a transceiver configured to operate on the wireless network (e.g. including an 802.11-compliant transceiver, etc.) and pass information received from the wireless network (e.g. the access point 812 or a node 814A-814C) to the non-wireless capable device 824 in a format understandable by that device. Likewise, the bridge 826 may pass information from the device 824 to the wireless network.

Various embodiments may be implemented with the aid of computer-implemented processes or methods (a.k.a. programs or routines) that may be rendered in any computer language including, without limitation, C#, C/C++, Fortran, COBOL, PASCAL, assembly language, markup languages (e.g. HTML, SGML, XML, VoXML), and the like, as well as object-oriented environments such as the Common Object Request Broker Architecture (CORBA), Java™ and the like. In general, however, all of the aforementioned terms as used herein are meant to encompass any series of logical steps performed in a sequence to accomplish a given purpose.

In view of the above, it should be appreciated that some portions of the detailed description are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities.

Unless specifically stated otherwise, it will be appreciated that throughout the description of various embodiments herein, use of terms such as "processing", "computing", "calculating", "determining", "displaying"or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The various embodiments disclosed above can be implemented, in various embodiments, with an apparatus to perform the operations described herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMS), EPROMs, EEPROMs, magnetic or optical cards, or any type of media suitable for storing electronic instructions, and each coupled to a computer system bus.

The algorithms and processes presented herein are not inherently related to any particular computer or other apparatus. Various general-purpose systems may be used with programs in accordance with the teachings herein, or it may prove convenient to construct more specialized apparatus to perform the required method. For example, any of the methods can be implemented in hard-wired circuitry, by programming a general-purpose processor or by any combination of hardware and software. One of ordinary skill in the art will immediately appreciate that the various embodiments described herein can be practiced with computer system configurations other than those described above, including handheld devices, multiprocessor systems, microprocessor-based or programmable consumer electronics, DSP devices, network PCs, minicomputers, mainframe computers, and the like. Such embodiments can also be practiced in distributed computing environments where tasks are performed by remote processing devices that are linked through a communications network. The required structure for a variety of these systems will appear from the above description.

In the present description certain actions and processes are characterized as being performed by "nodes," "access points," or other computer-based devices. It should be understood that such actions are performed under the direction of one or more computer processors included with such devices, the processors acting under the control of one or more sets of computer-readable instructions (i.e. software). As indicated above, these instructions are embodied on computer-readable media accessible by the processors. In some cases, the computer-readable instructions make up what is conventionally known as an application program, which itself relies on other, lower level computer programs (e.g. an operating system) for certain functions. Also, the applications programs may, at various intervals, seek confirmation from human users prior to implementing certain procedures. Such instructions are often provided by various input mechanisms, including but not limited to keystrokes of a keyboard, cursor control inputs from a cursor control device (e.g. a mouse, joystick, etc.), voice inputs (which are parsed and interpreted by yet additional computer readable instructions), and so on. Thus in one embodiment, software configured to control computer processors in accordance with the methods described herein is resident on one or more devices in the form of one or more application programs.

In one embodiment, terrorism may be countered utilizing the aforementioned technology. According to the U.S. Federal Bureau of Investigation, cyber-terrorism is any "premeditated, politically motivated attack against information, computer systems, computer programs, and data which results in violence against non-combatant targets by sub-national groups or clandestine agents." A cyber-terrorist attack is designed to cause physical violence or extreme financial harm. According to the U.S. Commission of Critical Infrastructure Protection, possible cyber-terrorist targets include the banking industry, military installations, power plants, air traffic control centers, and water systems. Thus, by optionally incorporating the present technology into the cyber-frameworks of the foregoing potential targets, terrorism may be countered by preventing hackers from infiltrating networks and initiating attacks, which may potentially cause extreme financial harm.

While various embodiments have been described above, it should be understood that they have been presented by way of example only, and not limitation. For example, while peer-to-peer and centrally-based networks are discussed specifically in the context of some embodiments, it should be noted in various other embodiments other networks are involved, etc. Thus, the breadth and scope of a preferred embodiment should not be limited by any of the above-described exemplary embodiments, but should be defined only in accordance with the following claims and their equivalents.

What is claimed is:

1. A method, comprising:
   distributing a key to a plurality of nodes of a wireless network for use in securing the nodes during use of the wireless network; and
   automatically updating the key at the nodes in the wireless network based on predetermined criteria;
   wherein the key is updated utilizing a software application downloaded by:
      advertising a peer-to-peer wireless network utilizing a granting node;
      allowing connection to the peer-to-peer wireless network utilizing a requesting node;
      in response to any request received from the requesting node, automatically redirecting the requesting node to a portal including a captive portal; and downloading the software application to the requesting node via the peer-to-peer wireless network utilizing the portal, the key being updated utilizing the downloaded software application;

wherein the portal includes a graphical user interface;

wherein the graphical user interface allows a user of the requesting node to download the software application;

wherein the software application is downloaded to the requesting node in response to the user selection of a button displayed as part of the graphical user interface;

wherein the portal includes a web page stored at the granting node;

wherein the software application carries out a process including:

exchanging a first key between the granting node and the requesting node via another peer-to-peer wireless network;

generating a human-perceptible hash at the granting node and the requesting node, utilizing the first key;

comparing the human-perceptible hashes via an out-of-band communication channel; and transmitting a second key to the requesting node for providing access to a centrally-based wireless network based on the comparison.

2. The method as recited in claim 1, wherein the wireless network includes a 802.11 wireless network.

3. The method as recited in claim 1, wherein the securing includes authenticating the nodes.

4. The method as recited in claim 1, wherein the securing includes encrypting communications between a plurality of the nodes.

5. The method as recited in claim 1, wherein the predetermined criteria requires that the key be automatically updated with a new key.

6. The method as recited in claim 1, wherein the predetermined criteria requires that the key be automatically updated based on rotation of a plurality of predetermined keys.

7. The method as recited in claim 1, wherein the predetermined criteria requires that the key be automatically updated based on a predetermined schedule.

8. The method as recited in claim 1, wherein the predetermined criteria requires that the key be automatically updated periodically.

9. The method as recited in claim 1, wherein the predetermined criteria requires that the key be automatically updated based on a random number.

10. The method as recited in claim 1, wherein the predetermined criteria requires that the key be automatically updated based on a pseudo-random number.

11. The method as recited in claim 10, wherein the pseudo-random number is generated utilizing a pseudo-random process capable of being carried out utilizing each of the nodes.

12. The method as recited in claim 11, wherein the pseudo-random process utilizes a seed value distributed to each of the nodes.

13. The method as recited in claim 1, wherein the predetermined criteria requires that the key be automatically updated in response to an instruction.

14. The method as recited in claim 13, wherein the instruction is received from an access point.

15. The method as recited in claim 1, wherein the predetermined criteria requires that the key be automatically updated utilizing a hint.

16. The method as recited in claim 15, wherein the hint includes a service set identifier.

17. The method as recited in claim 1, wherein the key includes a wireless equivalency privacy (WEP) key.

18. The method as recited in claim 1, wherein the redirecting occurs in response to an opening of a network browser utilizing the requesting node.

19. The method as recited in claim 1, wherein the redirecting is carried out in response to the request from the requesting node to access the centrally-based wireless network.

20. The method as recited in claim 19, wherein the centrally-based wireless network includes a network operating in an infrastructure mode.

21. The method as recited in claim 19, wherein the centrally-based wireless network requires that the software application be installed on the requesting node for allowing the access thereto.

22. The method as recited in claim 21, wherein the human-perceptible hash has less precision than the first key and can be traced back to the first key to determine that the first key is identical for the granting node and the requesting node.

23. The method as recited in claim 1, wherein the granting node redirects the requesting node to the portal.

24. The method as recited in claim 1, wherein the software application includes an applet.

25. The method as recited in claim 1, wherein the software application requires a separate installation process on the requesting node.

26. The method as recited in claim 1, wherein the portal includes another web page stored at an access point.

27. A computer program product embodied on a computer readable medium, comprising:

computer code for distributing a key to a plurality of nodes of a 802.11 wireless network for use in securing the nodes during use of the 802.11 wireless network; and computer code for automatically updating the key at the nodes in the 802.11 wireless network based on predetermined criteria;

wherein the key is updated utilizing computer code for a software application downloaded utilizing:

computer code for advertising a peer-to-peer wireless network utilizing a granting node;

computer code for connecting to the peer-to-peer wireless network utilizing a requesting node;

computer code for automatically redirecting the requesting node to a portal including a captive portal, in response to any request received from the requesting node; and computer code for downloading the software application to the requesting node via the peer-to-peer wireless network utilizing the portal, the key being updated utilizing the downloaded software application;

wherein the portal includes a graphical user interface;

wherein the graphical user interface allows a user of the requesting node to download the software application;

wherein the software application is downloaded to the requesting node in response to the user selection of a button displayed as part of the graphical user interface;

wherein the portal includes a web page stored at the granting node;

wherein the software application carries out a process including:

exchanging a first key between the granting node and the requesting node via another peer-to-peer wireless network;

generating a human-perceptible hash at the granting node and the requesting node, utilizing the first key;

comparing the human-perceptible hashes via an out-of-band communication channel; and transmitting a second key to the requesting node for providing access to a centrally-based wireless network based on the comparison.

28. A system, comprising:

a processor for distributing a key to a plurality of nodes of a 802.11 wireless network for use in securing the nodes during use of the 802.11 wireless network;

wherein the key is automatically updated at the nodes in the 802.11 wireless network;

wherein the key is updated utilizing a software application downloaded by:

advertising a peer-to-peer wireless network utilizing a granting node;

connecting to the peer-to-peer wireless network utilizing a requesting node;

in response to any request received from the requesting node, automatically redirecting the requesting node to a portal including a captive portal; and downloading the software application to the requesting node via the peer-to-peer wireless network utilizing the portal, the key being updated utilizing the downloaded software application;

wherein the portal includes a graphical user interface;

wherein the graphical user interface allows a user of the requesting node to download the software application;

wherein the software application is downloaded to the requesting node in response to the user selection of a button displayed as part of the graphical user interface;

wherein the portal includes a web page stored at the granting node;

wherein the software application carries out a process including:

exchanging a first key between the granting node and the requesting node via another peer-to-peer wireless network;

generating a human-perceptible hash at the granting node and the requesting node, utilizing the first key;

comparing the human-perceptible hashes via an out-of-band communication channel; and transmitting a second key to the requesting node for providing access to a centrally-based wireless network based on the comparison.

* * * * *